United States Patent
Gladden et al.

(10) Patent No.: US 8,297,054 B2
(45) Date of Patent: Oct. 30, 2012

(54) EXHAUST SYSTEM HAVING TURBO-ASSISTED HIGH-PRESSURE EGR

(75) Inventors: John Ray Gladden, Lafayette, IN (US); Paul Raymond Mineart, Jr., Lafayette, IN (US)

(73) Assignee: Caterpillar Inc., Peoria, IL (US)

(*) Notice: Subject to any disclaimer, the term of this patent is extended or adjusted under 35 U.S.C. 154(b) by 1034 days.

(21) Appl. No.: 12/289,663

(22) Filed: Oct. 31, 2008

(65) Prior Publication Data

US 2010/0107629 A1    May 6, 2010

(51) Int. Cl.
- F02B 33/44 (2006.01)
- F02B 33/00 (2006.01)
- F02M 25/07 (2006.01)

(52) U.S. Cl. .......... 60/605.2; 60/612; 123/562
(58) Field of Classification Search ............ 60/605.2, 60/612; 123/562; F02M 25/07
See application file for complete search history.

(56) References Cited

U.S. PATENT DOCUMENTS

| | | | |
|---|---|---|---|
| 4,231,225 A | 11/1980 | Aya | 60/605.2 |
| 5,406,796 A | 4/1995 | Hiereth et al. | 60/605.2 |
| 5,564,275 A | 10/1996 | Codan et al. | 60/605.2 |
| 5,611,202 A | 3/1997 | Sumser et al. | 60/605.2 |
| 5,791,146 A | 8/1998 | Dungner | 60/605.2 |
| 5,794,445 A | 8/1998 | Dungner | 60/605.2 |
| 5,937,651 A | 8/1999 | Braun et al. | 60/605.2 |
| 6,003,316 A * | 12/1999 | Baert et al. | 60/605.2 |
| 6,041,602 A * | 3/2000 | Dickey | 60/605.2 |
| 6,145,313 A | 11/2000 | Arnold | 60/605.2 |
| 6,205,785 B1 | 3/2001 | Coleman | 60/605.2 |
| 6,209,324 B1 | 4/2001 | Daudel et al. | 60/605.2 |
| 6,216,459 B1 | 4/2001 | Daudel et al. | 60/605.2 |
| 6,237,335 B1 | 5/2001 | Lönnqvist | 60/605.2 |
| 6,324,846 B1 | 12/2001 | Clarke | 60/605.2 |
| 6,508,241 B2 * | 1/2003 | Miller et al. | 123/672 |
| 7,571,608 B2 * | 8/2009 | Boyapati et al. | 60/605.2 |
| 2007/0193270 A1 | 8/2007 | Roozenboom et al. | 60/605.2 |
| 2008/0000228 A1 | 1/2008 | Kieser | 60/612 |
| 2010/0024416 A1* | 2/2010 | Gladden et al. | 60/605.2 |
| 2010/0024417 A1* | 2/2010 | Pierpont et al. | 60/605.2 |

FOREIGN PATENT DOCUMENTS

| | | | |
|---|---|---|---|
| JP | 05071426 A * | 3/1993 | |
| JP | 09126062 A * | 5/1997 | |
| JP | 2009167827 A * | 7/2009 | |
| KR | 2002049999 A * | 6/2002 | |

* cited by examiner

*Primary Examiner* — Thai Ba Trieu
(74) *Attorney, Agent, or Firm* — Finnegan, Henderson, Farabow, Garrett & Dunner LLP

(57) ABSTRACT

An exhaust system for a use with an engine is provided. The exhaust system may have an exhaust manifold configured to direct exhaust from the engine, and a main turbocharger connected to receive exhaust from the exhaust manifold. The exhaust system may also have a recirculation turbocharger having a compressor connected to receive exhaust from the exhaust manifold in parallel with the main turbocharger, and a turbine connected to receive exhaust from the main turbocharger to drive the compressor. The exhaust system may further have a control valve located downstream of the recirculation turbocharger to regulate exhaust flow through the compressor.

20 Claims, 1 Drawing Sheet

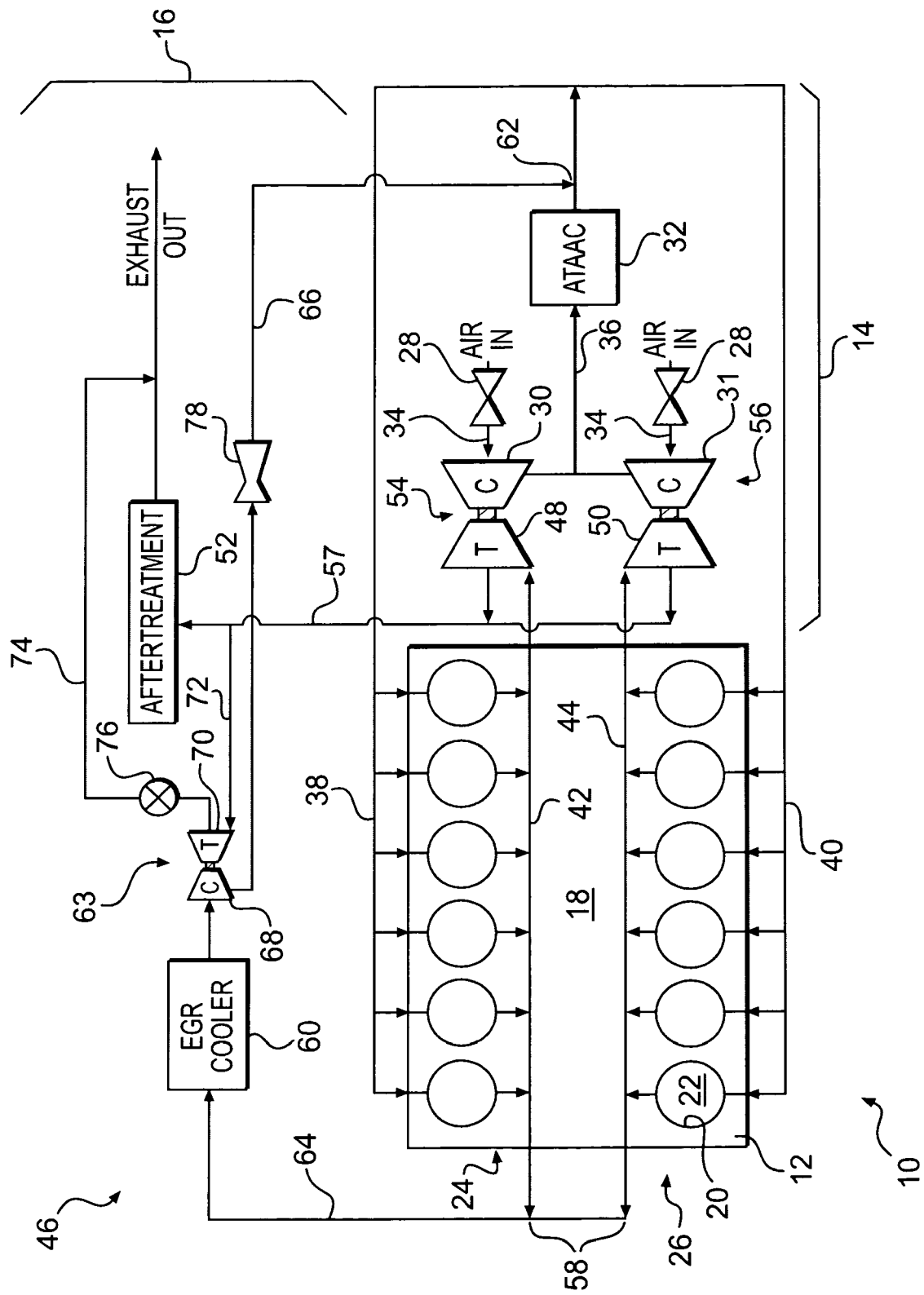

EXHAUST SYSTEM HAVING TURBO-ASSISTED HIGH-PRESSURE EGR

TECHNICAL FIELD

The present disclosure is directed to an exhaust system and, more particularly, to an exhaust system having turbo-assisted, high-pressure exhaust gas recirculation (EGR).

BACKGROUND

Combustion engines such as diesel engines, gasoline engines, and gaseous fuel-powered engines are supplied with a mixture of air and fuel for combustion within the engine that generates a mechanical power output. In order to maximize the power output generated by this combustion process, the engine is often equipped with a turbocharged air induction system. The turbocharged air induction system increases engine power by forcing more air into the combustion chambers than would otherwise be possible. This increased amount of air allows for enhanced fueling that further increases the power output of the engine.

In addition to the goal of maximizing engine power output and efficiency, it is desirable to simultaneously minimize exhaust emissions. That is, combustion engines exhaust a complex mixture of air pollutants as byproducts of the combustion process. And, due to increased attention on the environment, exhaust emission standards have become more stringent. The amount of pollutants emitted to the atmosphere from an engine can be regulated depending on the type of engine, size of engine, and/or class of engine.

One method that has been implemented by engine manufacturers to comply with the regulation of exhaust emissions includes utilizing an exhaust gas recirculating (EGR) system. EGR systems operate by recirculating a portion of the exhaust produced by the engine back to the intake of the engine to mix with fresh combustion air. The resulting mixture has a lower combustion temperature and, subsequently, produces a reduced amount of regulated pollutants.

Two types of EGR systems are commonly available, including a low-pressure system and a high-pressure system. Low-pressure EGR systems draw low-pressure exhaust from downstream of an engine's turbine, and direct the exhaust to a location within the air intake upstream of the engine's compressor. High-pressure EGR systems draw high-pressure exhaust from upstream of the engine's turbine, and direct the exhaust to a location within the air intake downstream of the engine's compressor. Although benefits can be associated with each type of system, certain drawbacks can also be inherent to each system. For example, low-pressure systems may, in some situations and applications, have difficulty providing EGR flow sufficient to adequately reduce emissions. High-pressure systems, although capable of providing greater EGR flow than low-pressure systems, may suffer from lower component life because of harsh conditions (e.g., elevated temperatures and pressures) experienced upstream of the turbine. Thus, a system is desired that provides sufficient EGR flow without adversely affecting system integrity.

U.S. Pat. No. 5,791,146 (the '146 patent) issued to Dungner on Aug. 1, 1998 discloses a turbo-charged engine having a high-pressure EGR system with a dedicated EGR turbocharger. Specifically, the engine includes divided exhaust manifolds each having an end connected to an inlet of a main turbocharger. One of the divided exhaust manifolds branches to also provide exhaust to a compressor of the dedicated EGR turbocharger. After passing through the main turbocharger, a main flow of exhaust from the engine is either directed through a turbine of the dedicated EGR turbocharger or around that turbine by way of a wastegate valve located in the main flow of exhaust. In this manner, the wastegate valve controls EGR flow. The EGR system of the '146 patent also includes a control valve located within the branch of the divided exhaust manifold to directly regulate a flow of exhaust passing to the compressor of the dedicated EGR turbocharger. By providing a high-pressure EGR system with a dedicated EGR turbocharger, the engine of the '146 patent may have high flow capacity.

Although the system of the '146 patent may have high flow capacity, components of the system may still deteriorate prematurely because of their location within the system. In particular, the location of the wastegate valve and the control valve may expose them to high temperatures, pressures, and flow rates that can cause them to fail prematurely.

The disclosed exhaust system is directed to overcoming one or more of the problems set forth above and/or other problems of the prior art.

SUMMARY

In one aspect, the disclosure is directed toward an exhaust system for an engine. The exhaust system may include an exhaust manifold configured to direct exhaust from the engine, and a main turbocharger connected to receive exhaust from the exhaust manifold. The exhaust system may also include a recirculation turbocharger having a compressor connected to receive exhaust from the exhaust manifold in parallel with the main turbocharger, and a turbine connected to receive exhaust from the main turbocharger to drive the compressor. The exhaust system may further include a control valve located downstream of the recirculation turbocharger to regulate exhaust flow through the compressor.

In another aspect, the disclosure is directed toward a method of managing exhaust from an engine. The method may include directing exhaust in parallel from the engine to a first turbocharger and to a second turbocharger, directing exhaust from the first turbocharger to the second turbocharger, and directing exhaust from the second turbocharger to the engine. The method may also include selectively restricting a flow of exhaust exiting the second turbocharger to regulate exhaust flow to the engine.

BRIEF DESCRIPTION OF THE DRAWING

FIG. 1 is a schematic illustration of an exemplary disclosed power system.

DETAILED DESCRIPTION

FIG. 1 illustrates a power system 10 having a power source 12, an air induction system 14, and an exhaust system 16. For the purposes of this disclosure, power source 12 is depicted and described as a four-stroke diesel engine. One skilled in the art will recognize, however, that power source 12 may be any other type of combustion engine such as, for example, a gasoline or a gaseous fuel-powered engine. Power source 12 may include an engine block 18 that at least partially defines a plurality of cylinders 20. A piston (not shown) may be slidably disposed within each cylinder 20 to reciprocate between a top-dead-center position and a bottom-dead-center position, and a cylinder head (not shown) may be associated with each cylinder 20. Cylinder 20, the piston, and the cylinder head may form a combustion chamber 22. In the illustrated embodiment, power source 12 includes twelve such combustion chambers 22 arranged into a first bank 24 and a second bank 26 (i.e., arranged into a V-configuration). However, it is contemplated that power source 12 may include a greater or lesser number of combustion chambers 22 arranged in an inline-configuration or in any other conventional configuration, if desired.

Air induction system 14 may include components configured to introduce charged air into power source 12. For example, air induction system 14 may include one or more induction valves 28, a first compressor 30 associated with first bank 24, a second compressor 31 associated with second bank 26, and an air cooler 32. Induction valves 28 may be connected upstream of first and second compressors 30, 31 via a fluid passage 34, and configured to regulate a flow of atmospheric air to power source 12. Each of first and second compressors 30, 31 may embody a fixed geometry compressor, a variable geometry compressor, or any other type of compressor configured to receive air by way of induction valves 28 and fluid passage 34, and to compress the air to a predetermined pressure level before it enters power source 12. First and second compressors 30 may be disposed in a parallel relationship and connected to power source 12 via a fluid passage 36 and separate intake manifolds 38 and 40. Air cooler 32 may embody an air-to-air heat exchanger, an air-to-liquid heat exchanger, or a combination of both, and be configured to facilitate the transfer of thermal energy to or from the compressed air directed into power source 12. Air cooler 32 may be disposed within fluid passage 36, between power source 12 and first and second compressors 30.

Exhaust system 16 may include components configured to manage exhaust flow from power source 12 to the atmosphere. Specifically, exhaust system 16 may include first and second exhaust manifolds 42 and 44 in fluid communication with combustion chambers 22, an exhaust gas recirculation (EGR) circuit 46 fluidly communicating first and second exhaust manifolds 42, 44 with air induction system 14, first and second turbines 48 and 50 separately associated with first and second exhaust manifolds 42, 44, and one or more aftertreatment devices 52. It is contemplated that exhaust system 16 may include components in addition to those listed above, if desired.

Energy removed from the exhaust exiting power source 12 may be utilized to compress inlet air. Specifically, first turbine 48 and first compressor 30 may together form a first main turbocharger 54 driven by exhaust from only first bank 24 received by way of first exhaust manifold 42. Similarly, second turbine 50 and second compressor 31 may together form a second main turbocharger 56 driven by exhaust from only second bank 26 received by way of second exhaust manifold 44. First and second main turbochargers 54, 56 may discharge exhaust in parallel to aftertreatment device(s) 52 by way of a passage 57. It should be noted that, during operation of power source 12, at least some of the exhaust from first and second main turbochargers 54, 56 may always pass through aftertreatment device(s) 52. First and second exhaust manifolds 42, 44 may both extend along a general length direction of power source 12, and connect to EGR circuit 46 at an end disposed opposite to first and second main turbochargers 54, 56.

EGR circuit 46 may include components that cooperate to redirect a portion of the exhaust produced by power source 12 from first and second exhaust manifolds 42, 44 to air induction system 14. Specifically, EGR circuit 46 may include one or more inlet ports 58, an EGR cooler 60, a discharge port 62, and a recirculation turbocharger 63. Inlet port(s) 58 may be fluidly connected to first and second exhaust manifolds 42, 44 to receive high-pressure exhaust at elevated temperatures in parallel with first and second turbines 48, 50 (i.e., to receive exhaust that has not yet passed through a turbine), and fluidly connected to EGR cooler 60 via a fluid passage 64. Discharge port 62 may receive exhaust from EGR cooler 60 via a fluid passage 66, and discharge exhaust to air induction system 14 at a location upstream or downstream of air cooler 32.

EGR cooler 60 may be configured to cool exhaust flowing through EGR circuit 46. EGR cooler 60 may include a liquid-to-air heat exchanger, an air-to-air heat exchanger, or any other type of heat exchanger known in the art for cooling an exhaust flow.

Recirculation turbocharger 63 may be driven by exhaust exiting power source 12 to compress exhaust redirected back into power source 12. Specifically, recirculation turbocharger 63 may include a compressor 68, and an associated turbine 70 connected to drive compressor 68. Compressor 68 may be connected to receive exhaust from fluid passage 64 after it has been cooled by EGR cooler 60, compress the exhaust to a desired pressure level, and discharge the compressed exhaust to fluid passage 66. Because of its connection to each of first and second exhaust manifolds 42, 44 via fluid passage 64 and inlet port(s) 58, compressor 68 may compress exhaust received from all of combustion chambers 22. Turbine 70 may be connected to receive exhaust from passage 57 via a branch passage 72 after the exhaust has passed through one of first and second main turbochargers 54, 56, and to utilize residual exhaust energy to drive compressor 68. Because of its connection of to each of first and second exhaust manifolds 42, 44 via passage 57 and first and second main turbochargers 54, 56, turbine 70 may receive and be driven by exhaust from all of combustion chambers 22. After removal of the residual exhaust energy, the exhaust passing through turbine 70 may be directed via a bypass passage 74 to rejoin a main exhaust flow downstream of aftertreatment device(s) 52.

It should be understood that the bypassing of exhaust around aftertreatment device(s) 52 via bypass passage 74 may affect a pressure differential between the main flow of exhaust from first and second turbines 48, 50 and the exhaust from turbine 70. That is, because the main flow of exhaust may pass through aftertreatment device(s) 52 and the exhaust from turbine 70 may not pass through aftertreatment device(s) 52, the exhaust from turbine 70 may experience less restriction. As a result of the lower restriction, a pressure differential may be created between the two exhaust flows (i.e., the exhaust passing through aftertreatment device(s) 52 may have a lower pressure than the exhaust passing through turbine 70). And, this pressure differential may help to drive turbine 70. In addition, the increased pressure caused by the restriction of aftertreatment device(s) 52, may help force more exhaust through EGR circuit 46.

To help regulate an amount of exhaust being recirculated back into power source 12 (i.e., an amount of exhaust passing through aftertreatment device(s) 52 or bypassing aftertreatment device(s) 52 to drive compressor 68 via turbine 70), exhaust system 16 may include a recirculation control valve 76. Recirculation control valve 76 may be disposed within bypass passage 74, downstream of turbine 70 (i.e., between turbine 70 and the location where exhaust from bypass passage 74 rejoins the main flow of exhaust exiting aftertreatment device(s) 52), to selectively restrict a flow of exhaust through bypass passage 74. Recirculation control valve 76 may be any type of valve known in the art such as, for example, a butterfly valve, a diaphragm valve, a gate valve, a ball valve, a poppet valve, or a globe valve. In addition, recirculation control valve 76 may be solenoid-actuated, hydraulically-actuated, pneumatically-actuated or actuated in any other manner to selectively restrict or completely block the flow of exhaust through bypass passage 74.

In on embodiment, recirculation control valve 76 may be regulated in response to sensory input. For example, a sensor 78 such as a mass flow sensor, may be located within one of fluid passages 66, 74, or 57 to generate a signal based on a flow rate of recirculated exhaust, bypassed exhaust, or the main exhaust flow exiting first and second turbines 48, 50. Based on signals received from sensor 78, operation of recirculation control valve 76 may be selectively adjusted to vary a restriction provided thereby.

Industrial Applicability

The disclosed exhaust system may be implemented into any power system application where charged air induction and exhaust gas recirculation are utilized. The disclosed exhaust system may be suitable for both high- and low-boost applications, and offers enhanced component durability. Specifically, the high-pressure nature of exhaust system 46, combined with turbocharging of recirculated exhaust, may offer effective EGR at a range of engine speeds and operating loads. Further, because exhaust system 46 may have critical components, for example recirculation control valve 76, sensor 78, and other components, positioned in low pressure, low-flow, and low-temperature locations, the integrity of these components may be preserved. The operation of exhaust system 16 will now be explained.

During operation of power system 10, air may be directed through induction valves 28 to first and second compressors 30, 31, where the separate flows of air may be pressurized to a desired level. The flows of pressurized air may then be combined and cooled within air cooler 32 before entering combustion chambers 22. Prior to or after entering combustion chambers 22, the cooled and compressed air may mix with fuel for subsequent combustion. Combustion of the air/fuel mixture may result in a mechanical power generation directed from power system 10 by way of a rotating crankshaft (not shown). Byproducts of combustion, namely exhaust and heat, may be directed from first and second banks 42, 44 of power system 10 separately and in parallel through first turbine 48 and second turbine 50. After imparting energy to first and second turbines 48, 50, the separate exhaust flows may be combined and directed to aftertreatment device(s) 52 for treatment thereof before being discharged to the atmosphere.

To help reduce formation of NOx, some exhaust from first and second exhaust manifolds 42, 44 may be redirected through EGR circuit 46 to mix with fresh air entering combustion chambers 22. That is, some exhaust from both first and second exhaust manifolds may flow through EGR cooler 60 and compressor 68 in parallel with the flows of exhaust passing through first and second turbines 48, 50. Simultaneously, a portion of the exhaust from first and second turbines 48, 50 may be directed to turbine 70, and the energy of that exhaust utilized to drive compressor 68. As exhaust passes through compressor 68, it may be pressurized to a desired level and directed to mix with intake air downstream of air cooler 32.

After exiting turbine 70, the exhaust may be directed to rejoin a main flow of exhaust exiting aftertreatment device(s) 52 for discharge to the atmosphere. It should be noted that some exhaust from first and second turbines 48, 50 may always bypass turbine 70 and flow directly through aftertreatment device(s) 52 to the atmosphere. The amount of exhaust directed through turbine 70 and, subsequently pressurized by compressor 68 and recirculated back into power source 12, may be controlled by regulating operation of recirculation control valve 76. The recirculated exhaust may help dilute the mixture and increase the thermal mass within combustion chambers 22, thereby resulting in a lower combustion temperature and a decreased rate of NOx formation.

It will be apparent to those skilled in the art that various modifications and variations can be made to the disclosed exhaust system. Other embodiments will be apparent to those skilled in the art from consideration of the specification and practice of the disclosed exhaust system. For example, it is contemplated that the exhaust passing through recirculation turbocharger 63 (i.e., through turbine 70) may additionally be treated to reduce the emission of regulated pollutants, if desired. It is also contemplated that the configuration of first and second main turbochargers 54, 56 may be different than shown and described. For example, rather than two separate main turbochargers, it is contemplated that a single turbocharger having a single or dual volutes may be utilized, if desired. It is intended that the specification and examples be considered as exemplary only, with a true scope being indicated by the following claims and their equivalents.

What is claimed is:

1. A method of managing exhaust from an engine, comprising:
    directing an exhaust flow in parallel from the engine to a first turbocharger and to a second turbocharger;
    directing the exhaust flow from the first turbocharger to the second turbocharger;
    directing the exhaust flow from a compressor of the second turbocharger to the engine; and
    selectively restricting the exhaust flow exiting a turbine of the second turbocharger to regulate the exhaust flow to the engine from the compressor.

2. The method of claim 1, wherein selectively restricting includes selectively restricting the exhaust flow exiting a turbine of the second turbocharger.

3. The method of claim 2, further including treating exhaust exiting the first turbocharger and allowing the exhaust flow exiting the turbine of the second turbocharger to bypass the treating to create a pressure differential that pushes the exhaust flow through a compressor of the second turbocharger.

4. The method of claim 1, further including always bypassing at least a portion of the exhaust flow exiting the first turbocharger around the second turbocharger.

5. The method of claim 1, further including dividing the exhaust flow from the engine into a first flow of the exhaust flow and a second flow of the exhaust flow, wherein only the first flow of the exhaust flow passes through the first turbocharger, and both the first and second flows of the exhaust flow pass through a compressor and a turbine of the second turbocharger.

6. An exhaust system for an engine, comprising:
    an exhaust manifold configured to direct an exhaust flow from the engine;
    a main turbocharger connected to receive the exhaust flow from the exhaust manifold;
    a recirculation turbocharger having a compressor connected to receive the exhaust flow from the exhaust manifold in parallel with the main turbocharger, and a turbine connected to receive the exhaust flow from the main turbocharger to drive the compressor; and
    a control valve located downstream of the turbine of the recirculation turbocharger to regulate the exhaust flow through the compressor.

7. The exhaust system of claim 1, further including at least one aftertreatment device configured to receive the exhaust flow from the main turbocharger.

8. The exhaust system of claim 7, wherein exhaust received by the compressor of the recirculation turbocharger bypasses the at least one aftertreatment device to create a pressure differential that pushes the exhaust flow through the recirculation turbocharger.

9. The exhaust system of claim 1, wherein at least a portion of the exhaust flow from the main turbocharger always bypasses the recirculation turbocharger.

10. The exhaust system of claim 1, wherein:
the exhaust manifold is a first exhaust manifold associated with a first plurality of engine combustion chambers; and
the exhaust system further includes a second exhaust manifold associated with a second plurality of combustion chambers.

11. The exhaust manifold of claim 10, wherein the main turbocharger receives the exhaust flow from only the first exhaust manifold.

12. The exhaust system of claim 11, wherein the turbine of the recirculation turbocharger receives the exhaust flow from both of the first and second exhaust manifolds.

13. The exhaust system of claim 12, wherein the compressor of the recirculation turbocharger receives the exhaust flow from both of the first and second exhaust manifolds.

14. The exhaust system of claim 11, wherein the main turbocharger is a first main turbocharger and the exhaust system further includes a second main turbocharger configured to discharge the exhaust flow to the turbine of the recirculation turbocharger.

15. The exhaust system of claim 14, wherein the second main turbocharger receives the exhaust flow from only the second exhaust manifold.

16. The exhaust system of claim 1, wherein: the exhaust manifold extends generally along a length direction of the engine and includes a first end and a second end disposed opposite the first end; the main turbocharger is connected to receive the exhaust flow from the first end; and the compressor of the recirculation turbocharger is connected to receive the exhaust flow from the second opposing end.

17. The exhaust system of claim 1, further including an exhaust cooler located upstream of the compressor of the recirculation turbocharger.

18. The exhaust system of claim 1, further including a mass flow sensor located downstream of the compressor of the recirculation turbocharger.

19. An exhaust system for an engine, comprising:
a first exhaust manifold associated with a first plurality of engine combustion chambers, the first exhaust manifold configured to direct an exhaust flow from the engine;
a second exhaust manifold associated with a second plurality of engine combustion chambers, the second exhaust manifold configured to direct an exhaust flow from the engine;
a first main turbocharger connected to receive the exhaust flow from the first exhaust manifold;
a second main turbocharger configured to receive the exhaust flow from the second exhaust manifold;
a recirculation turbocharger having a compressor connected to receive the exhaust flow from the first and second exhaust manifolds in parallel with the first and second main turbochargers, and a turbine connected to receive the exhaust flow from the first and second main turbochargers to drive the compressor; and a control valve located downstream of the recirculation turbocharger to regulate the exhaust flow through the compressor.

20. A power system, comprising:
an engine;
an exhaust manifold configured to direct an exhaust flow from the engine;
an intake manifold configured to direct air into the engine;
a recirculation passage connecting the exhaust manifold to the intake manifold;
a main turbocharger driven by the exhaust flow exhaust in the exhaust manifold to pressurize air in the intake manifold;
an aftertreatment device located downstream of the main turbocharger to receive the exhaust flow from the main turbocharger;
a recirculation turbocharger located within the recirculation passage and having a compressor connected to receive the exhaust flow from the exhaust manifold in parallel with the main turbocharger, and a turbine connected to receive the exhaust flow from the main turbocharger to drive the compressor;
a bypass passage disposed between the turbine and a location downstream of the aftertreatment device; and
a control valve located within the bypass passage downstream of the turbine to regulate the exhaust flow through the compressor.

* * * * *